(12) United States Patent
Abe

(10) Patent No.: US 8,276,919 B2
(45) Date of Patent: Oct. 2, 2012

(54) HYDRAULIC CYLINDER

(75) Inventor: Yoshiyuki Abe, Ibaraki (JP)

(73) Assignee: Nok Corporation, Tokyo (JP)

( * ) Notice: Subject to any disclaimer, the term of this patent is extended or adjusted under 35 U.S.C. 154(b) by 63 days.

(21) Appl. No.: 12/793,035

(22) Filed: Jun. 3, 2010

(65) Prior Publication Data
US 2010/0308542 A1 Dec. 9, 2010

(30) Foreign Application Priority Data
Jun. 9, 2009 (JP) .................................. 2009-138584

(51) Int. Cl.
F16J 15/18 (2006.01)
F16J 15/32 (2006.01)
(52) U.S. Cl. ........................................ 277/551; 277/549
(58) Field of Classification Search .................. 277/349, 277/351, 549, 551, 589, 530, 609, 614, 616, 277/630, 637
See application file for complete search history.

(56) References Cited

U.S. PATENT DOCUMENTS

| | | | | |
|---|---|---|---|---|
| 5,709,283 A | * | 1/1998 | Nief | 180/428 |
| 6,161,838 A | * | 12/2000 | Balsells | 277/511 |
| 7,971,852 B2 | * | 7/2011 | Otsubo et al. | 251/144 |
| 2004/0119241 A1 | * | 6/2004 | Castleman | 277/436 |
| 2006/0175567 A1 | * | 8/2006 | Chan et al. | 251/214 |
| 2007/0273106 A1 | * | 11/2007 | Nomichi et al. | 277/558 |

FOREIGN PATENT DOCUMENTS

JP 2008-002571 1/2008

* cited by examiner

Primary Examiner — Gilbert Lee
(74) Attorney, Agent, or Firm — Harness, Dickey & Pierce, P.L.C.

(57) ABSTRACT

The hydraulic cylinder having a portion on a side of a lip tip end of an annular clearance between an inner circumferential face of a shaft hole of a cylinder and a piston is made up of a minute clearance in order to suppress protrusion of the lip, wherein an annular clearance area for suppressing occurrence of the cavitation and for shortening an axial distance of the annular clearance portion made up of the minute clearance is formed on an opposite side of the annular clearance portion from a mounting groove.

7 Claims, 4 Drawing Sheets

HYDRAULIC CYLINDER

BACKGROUND OF THE INVENTION

1. Field of the Invention

The present invention relates to a hydraulic cylinder.

2. Description of the Related Art

In general, the hydraulic cylinder includes a piston, a cylinder, and a seal member for sealing an annular clearance between them. In the hydraulic cylinder, a piston is inserted into a shaft hole formed in the cylinder while leaving a minute clearance between an inner circumferential face of the shaft hole and the piston.

In a hydraulic cylinder such as that used for a breaker in which the piston and the cylinder relatively reciprocate at high speed and which is used in an environment of high hydraulic pressure, cavitation occurs in the minute clearance.

If the cavitation occurs, a cavitation shock wave or the like due to collapse of a bubble instantaneously generates extremely high pressure around a position where the cavitation has occurred. As a result, if the cavitation occurs near a lip of a seal member mounted into an annular mounting groove formed in an inner periphery of the shaft hole, vermiculate chips occur at portions near a tip end of the lip and sealing performance reduces.

In a technique disclosed in Japanese Patent Application Laid-Open No. 2008-2571, for example, a notch is formed in a portion of a mounting groove into which a seal member is mounted and near a tip end of a lip to thereby increase a distance from a position where cavitation occurs to the seal member. Such related art will be described with reference to FIG. 6. FIG. 6 is a schematic sectional view of an area of a related art hydraulic cylinder where the seal member is provided.

As shown in the drawing, in the hydraulic cylinder, a piston 200 is inserted into a shaft hole in a cylinder 300. A packing 100 that is the seal member is mounted into the annular mounting groove 301 formed in an inner periphery of the shaft hole of the cylinder 300. In the related art, oil is sealed in on a left side in the drawing and gas is sealed in on a right side in the drawing. Hereafter, the left side in the drawing will be referred to as an oil side (O) and the right side in the drawing will be referred to as a gas side (G). In the related art, the packing 100 includes a packing main body 101 and a backup ring 102 for preventing the packing main body 101 from protruding into a minute clearance S at an inner circumferential end portion on a low-pressure side.

In the related art, a small-diameter groove 302 (notch) adjacent to the mounting groove 301 is formed on a side of a tip end (oil side (O)) of a lip 101a of the packing main body 101. As described above, the cavitation occurs in the minute clearance S and the groove 302 increases a distance from a position where the cavitation occurs to the packing 100. In this way, it is possible to suppress reduction in sealing performance caused by the cavitation.

In the hydraulic cylinder according to this related art, however, the groove 302 having a relatively large clearance is formed on the side of the tip end of the lip 101a of the packing main body 101 and therefore, part of or the whole lip 101a may be fitted in the groove 302. This may cause damage to the lip 101a such as a chap at a tip end of the lip 101a and a chip of a portion of the lip 101a. Therefore, it is difficult to provide the groove 302 as measures against the cavitation as in the related art depending on specifications.

SUMMARY OF THE INVENTION

It is an object of the present invention to provide a hydraulic cylinder capable of suppressing occurrence of cavitation near a tip end of a lip of a seal member while protecting the tip end of the lip.

To achieve the above object, the present invention has employed the following means.

In other words, in the invention, a clearance on a side of a lip tip end of the seal member is made up of a minute clearance so as to suppress protrusion of the lip and an axial distance of the portion made up of the minute clearance is shortened so as not to cause the cavitation.

This will be described more specifically. Cavitation is a phenomenon in which part of liquid evaporates to form bubbles when flow velocity of a fluid is extremely high and pressure of the part of the liquid falls below saturation pressure for the liquid temperature and then the bubbles collapse. Because the flow velocity of the fluid is high in the minute clearance, the cavitation is likely to occur in this portion. However, if an axial distance of the portion made up of the minute clearance is shortened, a distance which the fluid flows through the portion made up of the minute clearance becomes short. Therefore, the fluid does not go as far as to form the bubbles while it flows through the portion made up of the minute clearance. In this way, it is possible to suppress occurrence of the cavitation.

Because the clearance on the side of the lip tip end of the seal member is made up of the minute clearance so as to suppress protrusion of the lip in this structure, it is possible to suppress fitting of the tip end of the lip in the clearance.

More specifically, according to the present invention, there is provided the hydraulic cylinder including a cylinder having a shaft hole, a piston inserted into the shaft hole, and a seal member mounted in an annular mounting groove formed in an inner periphery of the shaft hole to seal an annular clearance between the inner periphery of the shaft hole and the piston, the seal member including a lip extending in an axial direction to slide against the piston, and a portion on a side of a lip tip end of the annular clearance between the inner circumferential face of the shaft hole and the piston being made up of a minute clearance in order to suppress protrusion of the lip, wherein an annular clearance area for suppressing occurrence of cavitation and for shortening an axial distance of the annular clearance portion made up of the minute clearance is formed on an opposite side of the annular clearance portion from the mounting groove.

In addition, according to the present invention, there is provided the hydraulic cylinder including a cylinder having a shaft hole, a piston inserted into the shaft hole, and a seal member mounted in an annular mounting groove formed in an inner periphery of the shaft hole to seal an annular clearance between the inner periphery of the shaft hole and the piston, the seal member including a lip extending in an axial direction to slide against the piston, wherein a small-diameter groove adjacent to the mounting groove and having a smaller diameter than the mounting groove is formed on a side of a lip tip end while leaving an annular clearance between the piston and the small-diameter groove having such a width as not to cause the cavitation and an annular member is mounted on a small-diameter groove side in the mounting groove so that an annular clearance between the piston and the annular member is a minute clearance in order to suppress protrusion of the lip and that an axial distance of the minute clearance is short.

Further, according to the present invention, there is provided the hydraulic cylinder including a cylinder having a shaft hole, a piston inserted into the shaft hole, and a seal member mounted in an annular mounting groove formed in an inner periphery of the shaft hole to seal an annular clearance between the inner periphery of the shaft hole and the piston, the seal member including a lip extending in an axial direction to slide against the piston, wherein an annular member is mounted on a side of a lip tip end in the mounting groove, a portion near the tip end of the lip of an annular clearance between an inner circumferential face of the annular member and the piston is made up of a minute clearance in order to suppress protrusion of the lip, and an annular clearance area for suppressing occurrence of cavitation and for shortening an axial distance of the annular clearance portion made up of the minute clearance is formed on an opposite side of the annular clearance portion from the seal member in an inner periphery of the annular member.

As described above, according to the invention, it is possible to suppress occurrence of the cavitation near the tip end of the lip while protecting the tip end of the lip of the seal member.

DETAILED DESCRIPTION OF EMBODIMENTS

With reference to the drawings, modes for carrying out the present invention will be described below in detail and in an illustrative manner based on embodiments. However, dimensions, materials, shapes, relative positions, and the like of component parts described in the embodiments are not intended to restrict a scope of the invention only to themselves unless otherwise specified.

Figure 1:
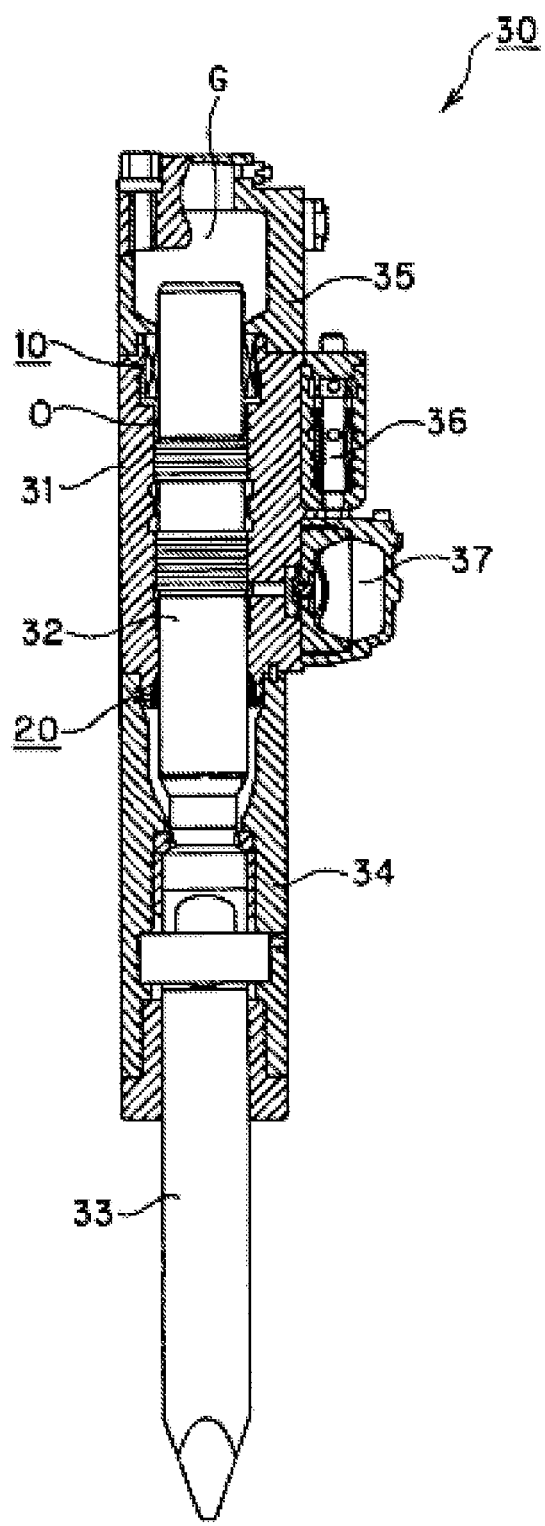
FIG. 1 is a schematic sectional view of a hydraulic cylinder according to embodiments of the present invention.

First, with reference to FIG. 1, a general structure and the like of a hydraulic cylinder according to embodiments of the invention will be described. Here, an example in which the hydraulic cylinder is applied to a breaker will be described.

The breaker 30 includes a cylindrical cylinder 31 having a shaft hole and a piston 32 inserted into the shaft hole in the cylindrical cylinder 31 while leaving a clearance (minute clearance) between an inner circumferential face of the shaft hole and the piston 32. A chisel (rod) 33 for crushing concrete, a rock, or the like is provided to a tip end of the piston 32.

A cylindrical front head 34 is coaxially fixed to a tip end of the cylinder 31. The chisel 33 is provided inside the front head 34 to be able to reciprocate. A thrust ring or a thrust bushing is mounted into the front head 34 to receive a shock from the chisel 33. A bottomed cylindrical back head 35 is coaxially fixed to a rear end of the cylinder 31. A hydraulic pressure taking-out port and a gas intake valve are mounted on the back head 35 and nitrogen gas G is filled in the back head 35.

The breaker 30 is also provided with a control valve 36 for controlling reciprocation of the piston 32 and an accumulator 37 filled with high-pressure nitrogen gas to carry out pressure compensation and prevention of pulsation for a hydraulic circuit provided in the cylinder 31.

To seal an annular clearance between the shaft hole formed in the cylinder 31 and the piston 32, a first sealing system 10 and a second sealing system 20 are respectively provided on a rear end side and a tip end side. In FIG. 1, the first sealing system 10 and the second sealing system 20 are shown in simple illustrations. Oil O is sealed in between the first sealing system 10 and the second sealing system 20. The first sealing system 10 has functions of preventing leakage of the oil O and preventing leakage of the above nitrogen gas G. The second sealing system 20 has functions of preventing leakage of the oil O and entry of dust from outside.

In the breaker 30 formed as described above, a pile-shaped chisel 33 is reciprocated with the piston 32 at high speed in an axial direction by hydraulic pressure and gas pressure and a tip end of the chisel 33 is struck against an object to be broken (concrete, the rock, or the like) to thereby crush the object to be broken. By compressing the gas with the hydraulic pressure and utilizing resilience of the gas, it is possible to move the piston 32 and the chisel 33 at high speed (e.g., 10 m/s) toward the object to be broken.

Next, embodiments 1 to 3 of the first sealing system 10 will be described.

First Embodiment

Figure 2:
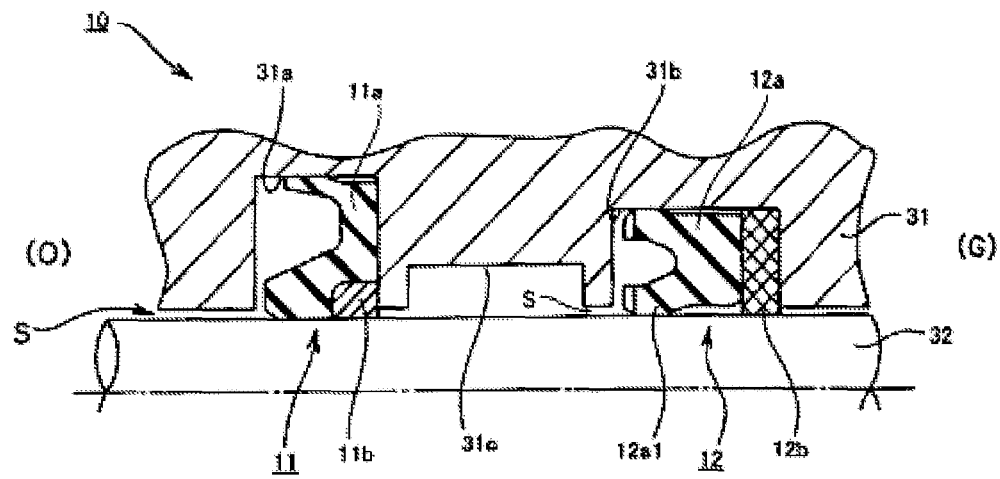
FIG. 2 is a schematic sectional view of an area of the hydraulic cylinder according to a first embodiment of the invention where a seal member is provided.
Figure 3:
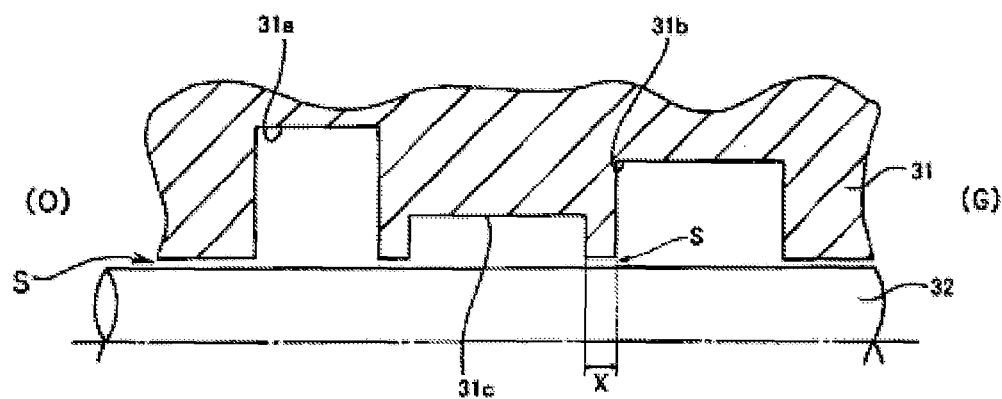
FIG. 3 is a schematic sectional view of an area of the hydraulic cylinder according to the first embodiment of the invention where the seal member is mounted.

With reference to FIGS. 2 and 3, a first sealing system 10 in a hydraulic cylinder according to the first embodiment of the invention will be described. FIGS. 2 and 3 are schematic sectional views of an area where the first sealing system is provided in the hydraulic cylinder. FIG. 2 shows a state in which various seals are mounted and FIG. 3 shows a state in which the various seals are not mounted.

The first sealing system 10 includes a buffer ring 11 and a packing 12 as a seal member. The buffer ring 11 has a buffer ring main body 11a having a substantially U sectional shape and a backup ring 11b for preventing the buffer ring main body 11a from protruding into a minute clearance S (clearance) at an inner circumferential end portion on a low-pressure side (gas side (G)).

The packing 12 similarly has a packing main body 12a having a substantially U sectional shape and a backup ring 12b for preventing the packing main body 12a from protruding into a minute clearance S at an inner circumferential end portion on a low-pressure side. The packing main body 12a has a lip 12a1 that axially extends toward an oil side (O) where the oil is sealed in and is sliding against the piston 32.

The buffer ring 11 mainly performs a function of buffering pressure of the oil (hydraulic pressure) that is an object of sealing-in and the packing 12 mainly performs a function of preventing leakage of the oil. The first sealing system 10 including the buffer ring 11 and the packing 12 prevents leakage of the oil into the gas side (G) where the nitrogen gas is filled and prevents the leakage of the nitrogen gas into the oil side where the oil is sealed in.

The buffer ring 11 and the packing 12 are respectively mounted in annular mounting grooves 31a and 31b formed in an inner periphery of the shaft hole formed in the cylinder 31.

Here, on a side of a tip end of the lip 12a1 of the packing main body 12a of the packing 12 mounted in the mounting groove 31b, an annular clearance formed between an inner circumferential face of the shaft hole of the cylinder 31 and the piston 32 is made up of the minute clearance S so that the lip 12a1 does not protrude.

Between the mounting groove 31a in which the buffer ring 11 is mounted and the mounting groove 31b in which the packing 12 is mounted, an annular groove 31c forming an annular clearance area for suppressing occurrence of cavitation is formed. In other words, provision of the annular groove 31c reduces an axial distance X of a portion made up of the minute clearance S on a side of a tip end of the lip 12a1. The axial distance X is set to such a short distance as not to cause occurrence of the cavitation while maintaining strength of a partition wall between the mounting groove 31b and the annular groove 31c in the cylinder 31.

This point will be described in further detail. As described above, flow velocity of a fluid increases in the minute clearance and therefore the cavitation is likely to occur in this portion. However, if the axial distance of the portion made up of the minute clearance is short, the fluid (oil here) does not go as far as to form bubbles while it flows through the portion made up of the minute clearance. In this way, it is possible to suppress occurrence of the cavitation. Consequently, the shorter the axial distance X, the more it is possible to suppress occurrence of the cavitation. However, the shorter the axial distance X, the thinner the partition wall between the mounting groove 31b and the annular groove 31c becomes and the lower the strength becomes. Therefore, it is necessary to reduce the axial distance X without causing a problem such as breakage of the partition wall.

Here, the axial distance with which the cavitation does not occur is determined by physical properties of the fluid flowing through the minute clearance S, width of the minute clearance S, and a maximum flow velocity of the fluid. The maximum flow velocity is determined by a relative moving velocity of the cylinder 31 and the piston 32, viscosity of the fluid, and the like.

As described above, according to the first sealing system 10 in the breaker 30 (hydraulic cylinder) according to the embodiment, it is possible to suppress occurrence of the cavitation near the packing 12 (near the lip 12a1 of the packing main body 12a). As a result, it is possible to suppress reduction of sealing performance caused by the cavitation. Because the clearance on the side of the tip end of the lip 12a1 is made up of the minute clearance S so as to suppress protrusion of the lip 12a1, fitting of the tip end of the lip 12a1 into the minute clearance S is suppressed. Consequently, deterioration of quality of the packing 12 can be suppressed and durability of the packing 12 can be increased.

Second Embodiment

Figure 4:
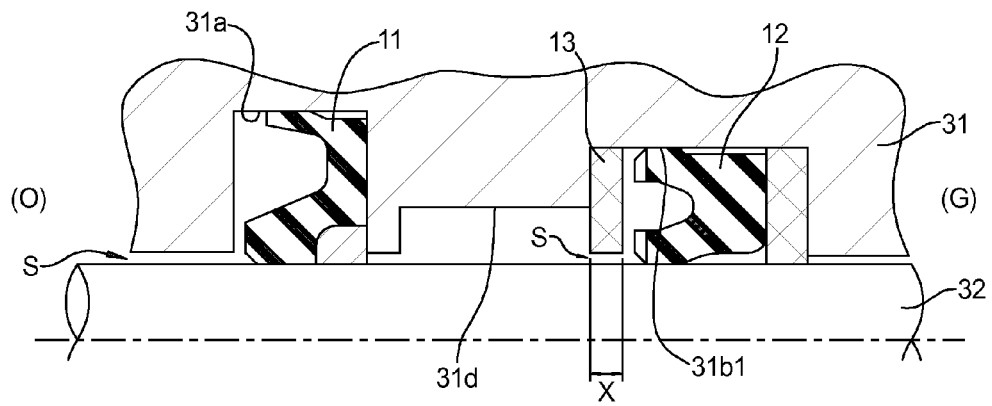
FIG. 4 is a schematic sectional view of an area of a hydraulic cylinder according to a second embodiment of the invention where a seal member is provided.

With reference to FIG. 4, a first sealing system in a hydraulic cylinder according to the second embodiment of the invention will be described. Basic structures are the same as those in the first embodiment and component portions having the same basic structures as those in the first embodiment will be provided with the same reference numerals and will not be described. Because structures of the buffer ring 11 and the packing 12 are the same as those in the first embodiment, they are shown in simple illustrations in FIG. 4.

In the present embodiment, the annular mounting grooves 31a and 31b1 are similarly formed in the inner periphery of the shaft hole formed in the cylinder 31. The buffer ring 11 and the packing 12 are respectively mounted in the mounting grooves 31a and 31b1.

In the embodiment, a small-diameter groove 31d adjacent to the mounting groove 31b1 and having a smaller diameter than that of the mounting groove 31b1 is formed while leaving an annular clearance between the piston 32 and itself, width of the clearance being set to such a value as not to cause the cavitation. The small-diameter groove 31d is formed to be adjacent to the mounting groove 31b1 on the oil side (O), i.e., on a side of a tip end of the lip 12a1 (not shown in FIG. 4) of the packing main body 12a of the packing 12.

An annular member 13 made of resin is mounted on a small-diameter groove 31d side in the mounting groove 31b1. The annular member 13 is formed so that its outer circumferential face is inclose contact with an inner circumferential face of the mounting groove 31b1 and its side face on the oil side (O) is in close contact with an inner wall face on the oil side (O) of the mounting groove 31b1. An annular clearance between the inner circumferential face of the annular member 13 and the piston 32 is made up of the minute clearance S to prevent the lip 12a1 from protruding. Thickness of the annular member 13 (corresponding to the axial distance X of the portion made up of the minute clearance S) is set to be short so as not to cause the cavitation while maintaining strength of the annular member 13.

As described above, the small-diameter groove 31d in the embodiment corresponds to the annular groove 31c in the first embodiment. In other words, an area made up of the small-diameter groove 31d and the annular member 13 corresponds to the annular clearance area for suppressing occurrence of the cavitation in the first embodiment. The annular member 13 in the embodiment corresponds to the partition wall between the mounting groove 31b and the annular groove 31c in the first embodiment. Therefore, in the embodiment, similar operation and effects to those in the first embodiment can be obtained.

Third Embodiment

Figure 5:
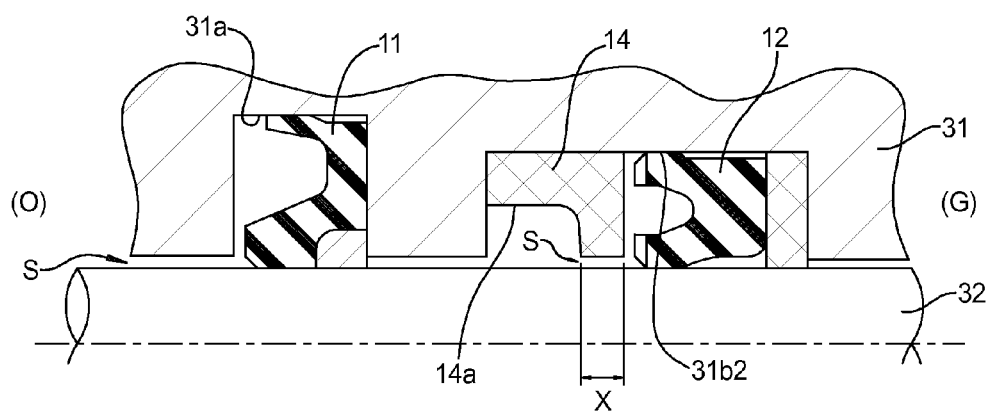
FIG. 5 is a schematic sectional view of an area of a hydraulic cylinder according to a third embodiment of the invention where a seal member is provided.
Figure 6:
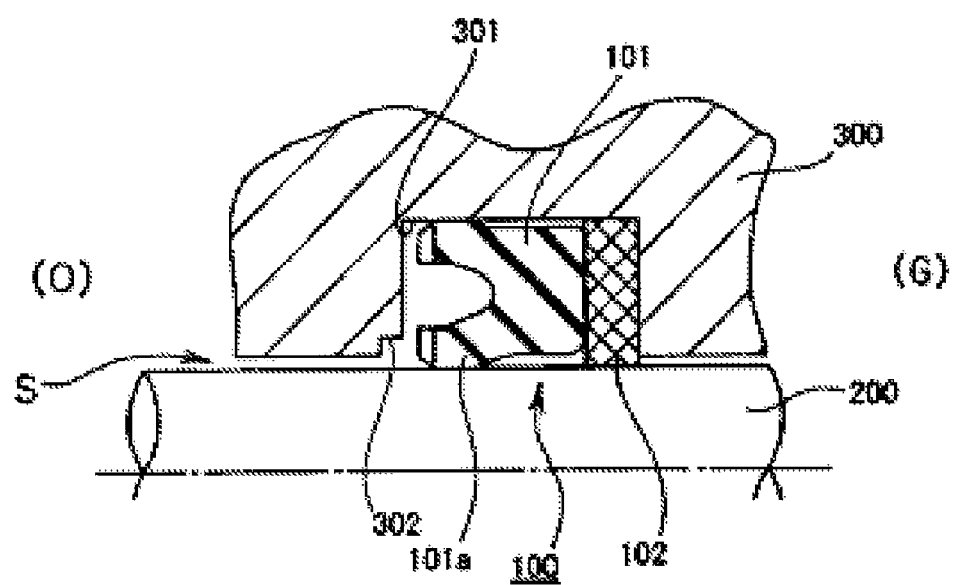
FIG. 6 is a schematic sectional view of an area of a related art hydraulic cylinder where a seal member is provided.

With reference to FIG. 5, a first sealing system in a hydraulic cylinder according to the third embodiment of the invention will be described. Basic structures are the same as those in the first embodiment and component portions having the same basic structures as those in the first embodiment will be provided with the same reference numerals and will not be described. Because structures of the buffer ring 11 and the packing 12 are the same as those in the first embodiment, they are shown in simple illustrations in FIG. 5.

In the present embodiment, the annular mounting grooves 31a and 31b2 are similarly formed in the inner periphery of the shaft hole formed in the cylinder 31. The buffer ring 11 and the packing 12 are respectively mounted in the mounting grooves 31a and 31b2.

In the embodiment, an annular member 14 made of resin is mounted on an oil side (O), i.e., on a side of a tip end of the lip 12a1 (not shown in FIG. 5) in the mounting groove 31b2. The annular member 14 is formed so that its outer circumferential face is in close contact with an inner circumferential face of the mounting groove 31b2 and its side face on the oil side (O) is in close contact with an inner wall face on the oil side (O) of the mounting groove 31b2.

A portion near the packing 12 (near the lip 12a1) of an annular clearance between the inner circumferential face of the annular member 14 and the piston 32 is made up of the minute clearance S so as to prevent the lip 12a1 from protruding. An annular notch 14a forming an annular clearance area for shortening an axial distance X of the annular clearance portion and for suppressing occurrence of the cavitation is formed in an inner periphery of the annular member 14 on an opposite side of the annular clearance portion made up of the minute clearance S from the packing 12. In this way, the axial distance X of the portion made up of the minute clearance S is set to a short distance so as not to cause the cavitation while maintaining strength of the portion near the portion made up of the minute clearance S of the annular member 14.

As described above, the notch 14*a* in the embodiment corresponds to the annular groove 31*c* in the first embodiment. In other words, an area made up of the notch 14*a* and the inner wall face on the oil side (O) of the mounting groove 31*b*2 corresponds to the annular clearance area for suppressing occurrence of the cavitation in the first embodiment. The portion of the annular member 14 not provided with the notch 14*a* on the inner circumferential face side in the embodiment corresponds to the partition wall between the mounting groove 31*b* and the annular groove 31*c* in the first embodiment. Therefore, in the embodiment, similar operation and effects to those in the first embodiment can be obtained.

OTHERS

Described in the above embodiments are the case in which the annular clearance area for suppressing occurrence of the cavitation is made up of the annular groove formed in a position away from the mounting groove mounted with the seal member (first embodiment), the case in which the annular clearance area is made up of the small-diameter groove adjacent to the mounting groove (second embodiment), and the case in which the annular clearance area is made up of the notch formed in the annular member mounted in the mounting groove (third embodiment). However, the method of forming the annular clearance area for suppressing occurrence of the cavitation is not limited to them. For example, the small-diameter groove shown in the second embodiment and the notch formed in the annular member shown in the third embodiment may be combined with each other to form the annular clearance area.

In the structures shown in the above embodiments 1 to 3, occurrence of the cavitation is suppressed near the seal member (packing 12) in the first sealing system 10 provided in the breaker 30. However, the second sealing system 20 is also provided with the seal member and the structures shown in the above embodiments 1 to 3 may be employed near the seal member in order to suppress occurrence of the cavitation. Although the breaker is shown as an example of the hydraulic cylinder in the embodiment, the structures shown in the above embodiments 1 to 3 may be employed to suppress occurrence of the cavitation near seal members in other hydraulic cylinders.

This application claims priority from Japanese Patent Application No. 2009-138584 (Jun. 9, 2009), which is hereby incorporated by reference.

What is claimed is:

1. A hydraulic cylinder comprising:
   a cylinder having a shaft hole;
   a piston inserted into the shaft hole; and
   a seal member mounted in an annular mounting groove formed in an inner periphery of the shaft hole to seal an annular clearance between the inner periphery of the shaft hole and the piston,
   the seal member including a main body and a lip formed integral with and extending in an axial direction from said main body to slide against the piston, and
   a portion of the annular clearance on a side of a tip end of the lip between the inner circumferential face of the shaft hole and the piston being made up of a minute clearance formed directly in the inner periphery of the shaft hole of the cylinder in order to suppress protrusion of the lip,
   an annular clearance area formed directly in the inner periphery of the shaft hole of the cylinder for suppressing occurrence of cavitation and for shortening an axial distance of the annular clearance portion made up of the minute clearance, said annular clearance area is formed on an opposite side of said minute clearance from the seal member, said annular clearance area having a smaller inner diameter than said annular mounting groove and a larger inner diameter than said minute clearance.

2. A hydraulic cylinder comprising:
   a cylinder having a shaft hole;
   a piston inserted into the shaft hole; and
   a seal member mounted in an annular mounting groove formed in an inner periphery of the shaft hole to seal an annular clearance between the inner periphery of the shaft hole and the piston,
   the seal member including a main body and a lip formed integral with and extending in an axial direction from said main body to slide against the piston,
   a small-diameter groove formed directly in the inner periphery of the shaft hole directly adjacent to the mounting groove and having a smaller diameter than the mounting groove is formed on a side of a tip end of said lip while leaving an annular clearance between the piston and the small-diameter groove having such a width as not to cause cavitation and
   an annular member is mounted on a small-diameter groove side in the mounting groove axially between the tip end of said seal member and said small diameter groove so that an annular clearance between the piston and the annular member is a minute clearance smaller than a clearance between the piston and the small diameter groove in order to suppress protrusion of the lip and that an axial distance of the minute clearance is shorter than an axial distance of the small diameter groove.

3. The hydraulic cylinder according to claim 2, wherein said annular member is made of resin.

4. The hydraulic cylinder according to claim 2, wherein said annular member is not in contact with said piston.

5. A hydraulic cylinder comprising:
   a cylinder having a shaft hole;
   a piston inserted into the shaft hole; and
   a seal member mounted in an annular mounting groove formed in an inner periphery of the shaft hole to seal an annular clearance between the inner periphery of the shaft hole and the piston,
   the seal member including a main body and a lip formed integral with and extending in an axial direction from said main body to slide against the piston,
   wherein an annular member is mounted on a side of a tip end of the lip in the mounting groove, a portion of the annular member near the tip end of the lip defines a minute clearance between an inner circumferential face of the annular member and the piston in order to suppress protrusion of the lip, and
   the annular member further defines an annular clearance area having a smaller inner diameter than said mounting groove and a larger inner diameter than said minute clearance for suppressing occurrence of cavitation and for shortening an axial distance of the minute clearance, said annular clearance area being formed on an opposite side of the minute clearance from the seal member directly in an inner periphery of the annular member.

6. The hydraulic cylinder according to claim 5, wherein said annular member is made of resin.

7. The hydraulic cylinder according to claim 5, wherein said annular member is not in contact with said piston.

* * * * *

UNITED STATES PATENT AND TRADEMARK OFFICE
CERTIFICATE OF CORRECTION

| | | |
|---|---|---|
| PATENT NO. | : 8,276,919 B2 | Page 1 of 1 |
| APPLICATION NO. | : 12/793035 | |
| DATED | : October 2, 2012 | |
| INVENTOR(S) | : Yoshiyuki Abe | |

It is certified that error appears in the above-identified patent and that said Letters Patent is hereby corrected as shown below:

On the Title Page:

Item (73) Assignee: "Nok" should be --NOK--.

Signed and Sealed this

Fourth Day of December, 2012

David J. Kappos
*Director of the United States Patent and Trademark Office*